US009586757B2

United States Patent
Kainuma et al.

(10) Patent No.: US 9,586,757 B2
(45) Date of Patent: Mar. 7, 2017

(54) STACKER CRANE (71) Applicant: Murata Machinery, Ltd., Kyoto-shi, Kyoto (JP)

(72) Inventors: Hiroyuki Kainuma, Inuyama (JP); Tetsuji Tanahashi, Inuyama (JP)

(73) Assignee: Murata Machinery, Ltd., Kyoto (JP)

( * ) Notice: Subject to any disclaimer, the term of this patent is extended or adjusted under 35 U.S.C. 154(b) by 64 days.

(21) Appl. No.: 14/625,715

(22) Filed: Feb. 19, 2015

(65) Prior Publication Data
US 2015/0158670 A1    Jun. 11, 2015

Related U.S. Application Data (63) Continuation of application No. PCT/JP2013/069882, filed on Jul. 23, 2013.

(30) Foreign Application Priority Data

Sep. 4, 2012 (JP) ................... 2012-193884

(51) Int. Cl.
*B65G 1/04* (2006.01)
*B66F 9/07* (2006.01)
(Continued)

(52) U.S. Cl.
CPC ............. *B65G 1/0407* (2013.01); *B65G 1/06* (2013.01); *B66B 7/047* (2013.01); *B66F 9/07* (2013.01)

(58) Field of Classification Search
CPC .................................. B66B 7/047; B66F 9/07
See application file for complete search history.

(56) References Cited

U.S. PATENT DOCUMENTS 722,444 A * 3/1903 Bouck ...................... B66F 9/07
187/244
3,111,227 A * 11/1963 Lofquist .................. B66F 9/07
212/291
(Continued)

FOREIGN PATENT DOCUMENTS

FR    2044635 A1 *  2/1971  ................ B66F 9/07
JP    05-22491 U       3/1993
(Continued)

OTHER PUBLICATIONS

English translation of Official Communication issued in corresponding International Application PCT/JP2013/069882, mailed on Mar. 19, 2015.
(Continued)

*Primary Examiner* — James Keenan
(74) *Attorney, Agent, or Firm* — Keating & Bennett, LLP (57) ABSTRACT

A stacker crane includes a platform disposed between a pair of front and back masts disposed in a vertical direction. The platform includes a horizontal frame with a transfer device mounted thereon and vertical frames extending from front and back ends of the horizontal frame along the masts. The platform is raised or lowered with the vertical frames suspended. The vertical frames each include a pair of first guide rollers sandwiching one of the masts in a lateral direction perpendicular or substantially perpendicular to a front-back direction and are each connected to the horizontal frame to be rotatable with respect to the horizontal frame using the lateral direction as an axis.

5 Claims, 11 Drawing Sheets (51) Int. Cl.
*B66B 7/04* (2006.01)
*B65G 1/06* (2006.01)

(56) References Cited

U.S. PATENT DOCUMENTS

| | | | | |
|---|---|---|---|---|
| 3,447,697 | A * | 6/1969 | Dolin | B66F 9/07 414/608 |
| 3,770,147 | A * | 11/1973 | Kito | B66F 9/07 104/123 |
| 3,791,529 | A * | 2/1974 | Thomas | B66F 9/07 212/281 |
| 4,007,843 | A * | 2/1977 | Lubbers | B65G 1/0414 104/48 |
| 9,169,109 | B2 * | 10/2015 | Iwata | B66F 9/07 |
| 2010/0032247 | A1 * | 2/2010 | Amada | B65G 1/0407 187/401 |
| 2010/0104405 | A1 * | 4/2010 | Amada | B66F 9/07 414/281 |
| 2010/0172728 | A1 * | 7/2010 | Amada | B66F 9/07 414/659 |

FOREIGN PATENT DOCUMENTS

| | | |
|---|---|---|
| JP | 11-208819 A | 8/1999 |
| JP | 2008-074543 A | 4/2008 |
| JP | 2008-081302 A | 4/2008 |
| JP | 2012-012152 A | 1/2012 |

OTHER PUBLICATIONS

Official Communication issued in International Patent Application No. PCT/JP2013/069882, mailed on Sep. 10, 2013.

* cited by examiner

STACKER CRANE

BACKGROUND OF THE INVENTION

1. Field of the Invention

The present invention relates to a stacker crane configured to perform a transfer function to retrieve or store work pieces from or into multiple racks.

2. Description of the Related Art

Stacker cranes have been used to retrieve or store workpieces from or into the storage shelves of racks installed in a warehouse. A stacker crane includes a platform configured to move vertically, and travels on tracks installed along racks, locates the platform near the desired one of storage shelves arranged vertically and horizontally in a rack, and retrieves or stores workpieces from or into the storage shelf using a transfer device mounted on the platform. There is known a type of stacker crane which includes a pair of masts disposed on a base configured to travel on tracks and a workpiece transfer device mounted on a platform configured to be raised or lowered while being guided by the masts, as disclosed in Japanese Unexamined Patent Application Publication No. 2008-74543 and Japanese Unexamined Patent Application Publication No. 2012-12152.

In the stacker cranes disclosed in Japanese Unexamined Patent Application Publication No. 2008-74543 and Japanese Unexamined Patent Application Publication No. 2012-12152, a platform is raised or lowered while being guided by a pair of masts, and linear motion guides are used as guiding parts. To restrain movement of the platform in directions other than the movement direction (vertical direction), the linear motion guides are formed by combining corrugated surfaces. By causing these corrugated surfaces to slide, the linearity of the movement is maintained. The platform guided by such linear motion guides does not wobble when raised or lowered and can stably carry work pieces. On the other hand, it has difficulty in increasing the elevation speed since it uses the sliding motion of the corrugated surfaces. As the sizes of warehouses have been increased in recent years, stacker cranes are required to increase the elevation speed of the platform. However, stacker cranes using linear motion guides have difficulty in increasing the elevation speed.

Conceivable configurations capable of increasing the elevation speed of the platform include one where a pair of guide rollers mounted on a platform sandwich a mast so that the platform is guided by the mast via the guide rollers. In this configuration, however, when the platform is tilted, the guide rollers may be detached from the mast. Thus, a portion of the platform may collide with the mast, resulting in damage to the mast, platform, or the like. Further, it takes time to recover from such a situation. Particularly, in a configuration where a platform is suspended from belts attached to a pair of masts, when the drive synchronization between the belts is lost, the platform is tilted. If the elevation speed is increased, the loss of the drive synchronization would increase the tilt of the platform.

SUMMARY OF THE INVENTION

Preferred embodiments of the present invention provide a stacker crane which includes a platform provided with guide rollers configured to increase an elevation speed and which when the platform is tilted, and prevents a portion of the platform from colliding with any mast to prevent damage to the mast or platform.

According to a preferred embodiment of the present invention, a stacker crane includes a platform disposed between a pair of front and back masts disposed in a vertical direction. The platform includes a horizontal frame including a transfer device mounted thereon and vertical frames extending from front and back ends of the horizontal frame along the masts. The platform is raised or lowered with the vertical frames suspended. The vertical frames are each provided with a pair of first guide rollers sandwiching one of the masts in a lateral direction perpendicular or substantially perpendicular to a front-back direction and are each connected to the horizontal frame so as to be rotatable with respect to the horizontal frame using the lateral direction as an axis.

In another preferred embodiment of the present invention, the horizontal frame preferably is provided with second guide rollers which are in contact with opposite surfaces of the pair of masts and which are configured to elastically expand and contract in the front-back direction. The vertical frames preferably are each provided with a stopper which, when the vertical frame rotates in a direction in which the vertical frame comes close to one of the masts, contacts the mast. The vertical frames preferably are each provided with a hook which, when the vertical frame rotates in a direction in which the vertical frame moves away from one of the masts, is stopped by the mast. The hook preferably is provided with an operation portion which, when the platform exceeds a lower-limit position or upper-limit position, activates a limit switch.

According to another preferred embodiment of the present invention, a method for using a stacker crane, in which a platform is disposed between a pair of front and back masts disposed in a vertical direction, is provided. The platform is provided with a horizontal frame including a transfer device mounted thereon and vertical frames extending from front and back ends of the horizontal frame along the masts. The vertical frames preferably are each provided with a pair of first guide rollers sandwiching one of the masts in a lateral direction perpendicular or substantially perpendicular to a front-back direction and are each connected to the horizontal frame so as to be rotatable with respect to the horizontal frame using the lateral direction as an axis. The platform is raised or lowered with the vertical frames suspended.

According to a preferred embodiment of the present invention, the vertical frames are connected to the horizontal frame so as to be rotatable with respect to the horizontal frame using the lateral direction as an axis. Thus, when the horizontal frame is tilted, the vertical frames rotate and do not follow the tilt of the horizontal frame. As a result, the first guide rollers are prevented from being detached from the masts and easily restored to their original state. Further, since the tilt of the vertical frames with respect to the masts is reduced, it is possible to prevent the vertical frames from colliding with the masts to prevent damage to the masts, platform, or the like.

If the second guide rollers are provided, when the horizontal frame moves or vibrates with respect to the masts in the front-back direction, the second guide rollers elastically contact the masts. Thus, it is possible to elastically hold the platform with respect to the masts in the front-back direction to prevent the platform from wobbling in the front-back direction. If the stoppers are provided, when any vertical frame rotates in a direction in which the vertical frame comes close to the corresponding mast, the corresponding stopper contacts the mast earlier than the vertical frame. Thus, the vertical frame is reliably prevented from colliding with the mast. If the hooks are provided, when any vertical frame rotates in a direction in which the vertical frame moves away from the corresponding mast, the corresponding hook is stopped by the mast. Thus, the vertical frame is prevented from being detached from the mast. If one of the hooks is provided with an operation portion to activate a limit switch, there is no need to support the operation portion using a dedicated long stay or the like, and the hook can be used in place of a stay.

The above and other elements, features, steps, characteristics and advantages of the present invention will become more apparent from the following detailed description of the preferred embodiments with reference to the attached drawings.

BRIEF DESCRIPTION OF THE DRAWINGS

FIGS. 6A and 6B are enlarged views of a major portion of a hook, in which FIG. 6A is an enlarged sectional view and FIG. 6B is an enlarged perspective view.

DETAILED DESCRIPTION OF THE PREFERRED EMBODIMENTS

Hereafter, preferred embodiments of the present invention will be described with reference to the drawings. However, the present invention is not limited to the preferred embodiments described herein. In the description below, the front-back direction of a stacker crane refers to the traveling direction of the stacker crane, and the lateral direction thereof refers to a horizontal direction perpendicular or substantially perpendicular to the travelling direction of the stacker crane. Also, in the description, an xyz Cartesian coordinate system is set if necessary, and the positional relationships between the elements are described with reference to this XYZ Cartesian coordinate system. The front-back direction of the stacker crane is defined as the x-axis direction, the lateral direction thereof as the y-axis direction, and the vertical direction thereof as the z-axis direction. To clarify the preferred embodiments of the present invention, the drawings are scaled as appropriate, for example, partially enlarged or highlighted.

Figure 1:
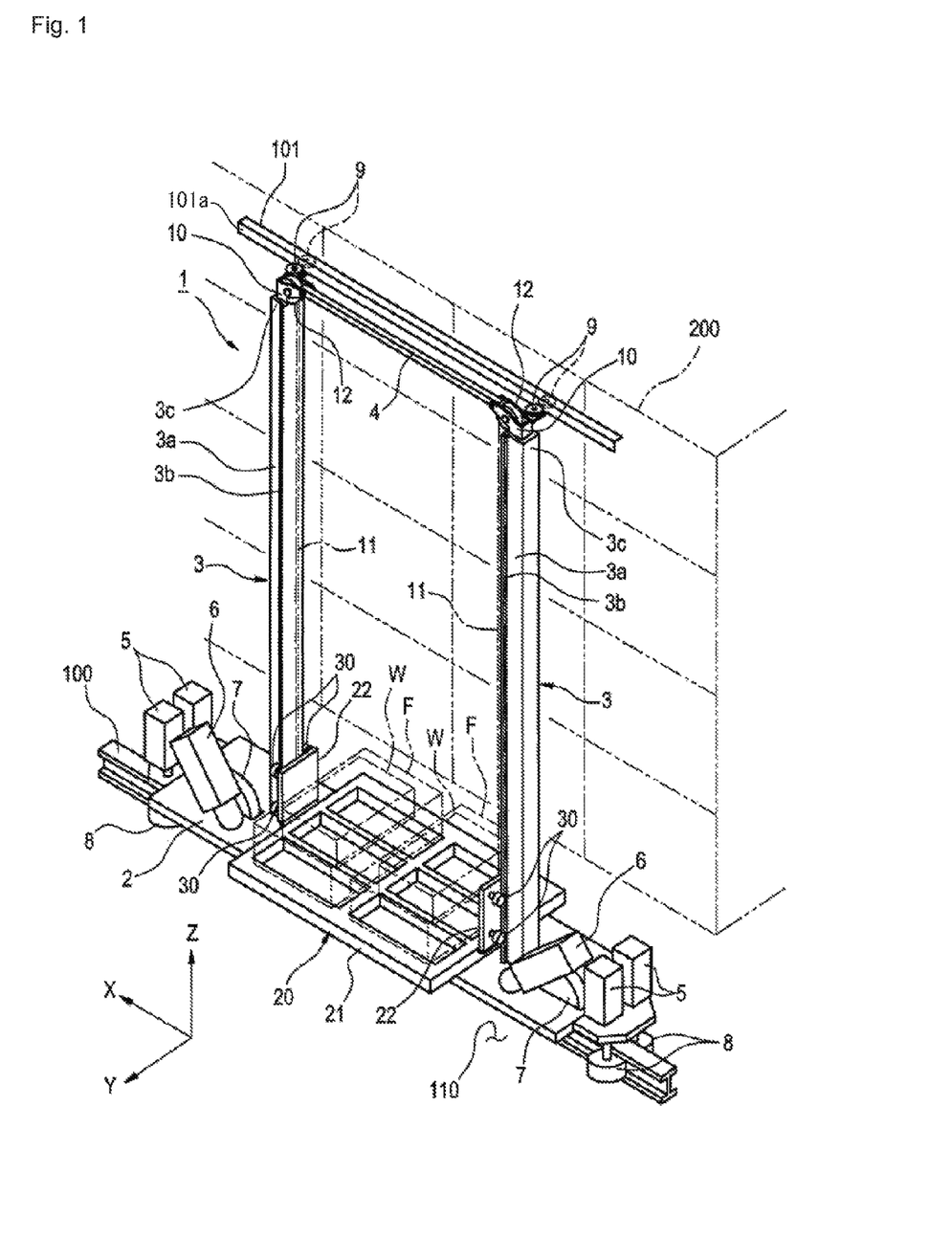
FIG. 1 is a perspective view showing a stacker crane according to a preferred embodiment of the present invention.

As shown in FIG. 1, a stacker crane 1 travels while being guided by a floor rail 100 installed along a rack 200 on the floor 110 of a warehouse and by a ceiling rail 101 installed along the rack 200 near the ceiling of the warehouse. The stacker crane 1 includes a rectangular or substantially rectangular base 2 configured to travel on the floor rail 100, a pair of masts 3 which are spaced from each other in the front-back direction (x-axis direction) on the base 2 and extend in the vertical direction (z-axis direction), and a platform 20 which is disposed between the masts 3 and is raised or lowered along the masts 3. The floor rail 100 preferably has a sectional shape of the letter I, and the ceiling rail 101 preferably has a sectional shape of the letter L, for example. The floor rail 100 and ceiling rail 101 are installed as a pair in the warehouse. The rack 200 includes multiple storage shelves disposed vertically and horizontally therein.

The base 2 is provided with traveling wheels 7 configured to travel on the floor rail 100 and pairs of drive wheels 8 sandwiching the floor rail 100 in the lateral direction (y-axis direction). The traveling wheels 7 are rotatably placed on the upper surface of the floor rail 100. The drive wheels 8 are driven by multiple traveling motors 5 mounted on the base 2 and thus cause the base 2 to travel in the front-back direction (x-axis direction). In the present preferred embodiment, four drive wheels 8 preferably are driven by four traveling motors 5, but the number of motors need not necessarily be 4. For example, all or some of the drive wheels 8 may be driven by one or two traveling motors 5.

The masts 3 include brackets 10 at the upper ends 3c thereof, and the brackets 10 are connected via a support beam 4. Pulleys 12 are rotatably disposed on the brackets 10. Timing belts 11 configured to raise or lower the platform 20 are hung on the pulleys 12. A pair of ceiling wheels 9 using the vertical direction (z-axis direction) as the rotation axis are disposed on each bracket 10 so as to sandwich a drooping piece 101a of the ceiling rail 101 in the lateral direction (y-axis direction). Thus, the base 2 is guided by the floor rail 100, and upper portions of the masts 3 are guided by the ceiling rail 101.

Figure 2:
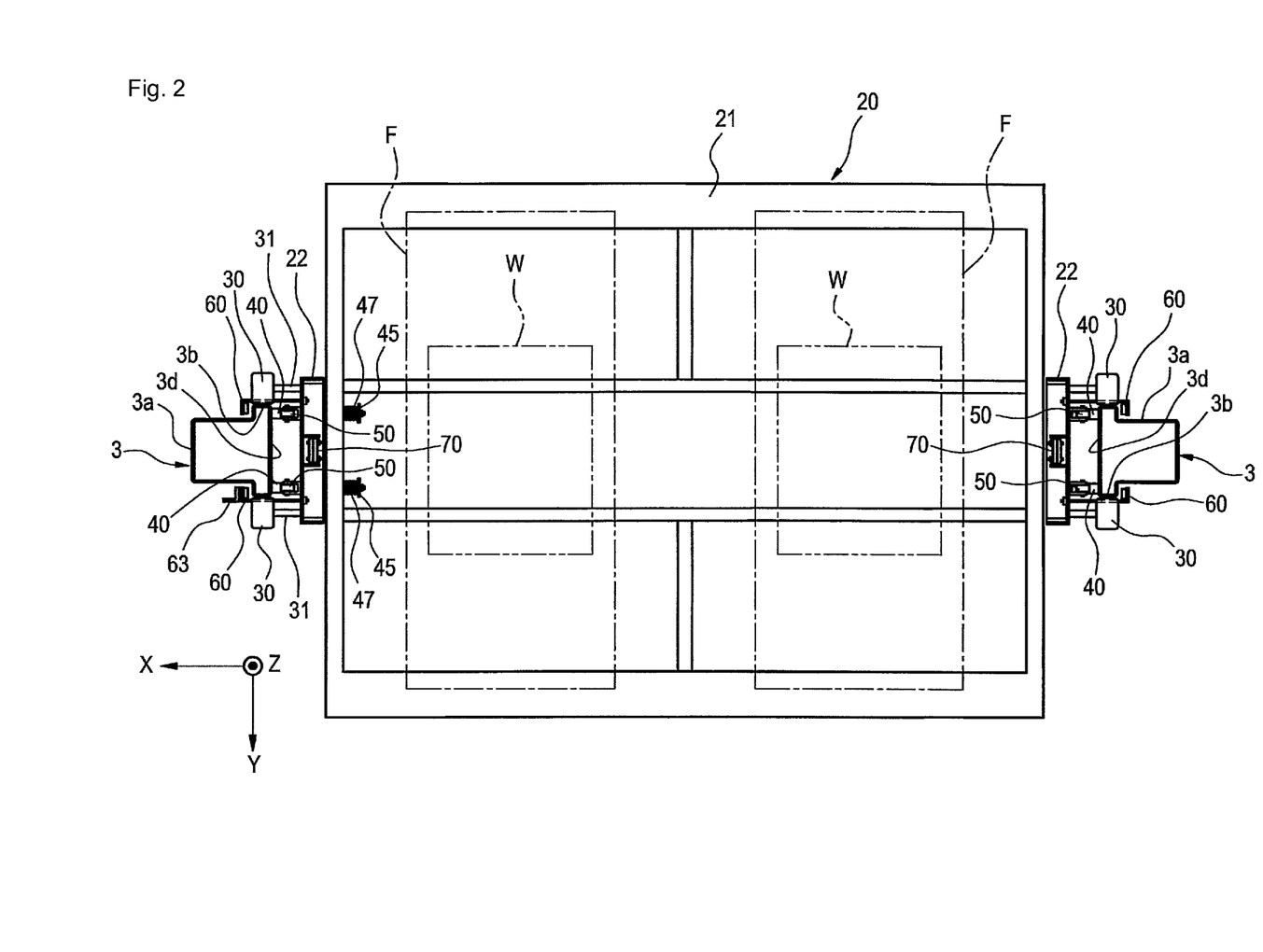
FIG. 2 is a plan view of a platform of the stacker crane shown in FIG. 1.

As shown in FIG. 2, the masts 3 preferably are hollow, rectangular or substantially rectangular members. The opposite surfaces 3d of the masts 3 are widened in the lateral direction so that these surfaces are wider than outer portions 3a thereof, thus defining a sectional shape of the letter T. The side surfaces of the widened portions are used as guides 3b and define and serve as guide surfaces which first guide rollers 30 (to be discussed later) are in contact with and are rolling on.

Figure 3:
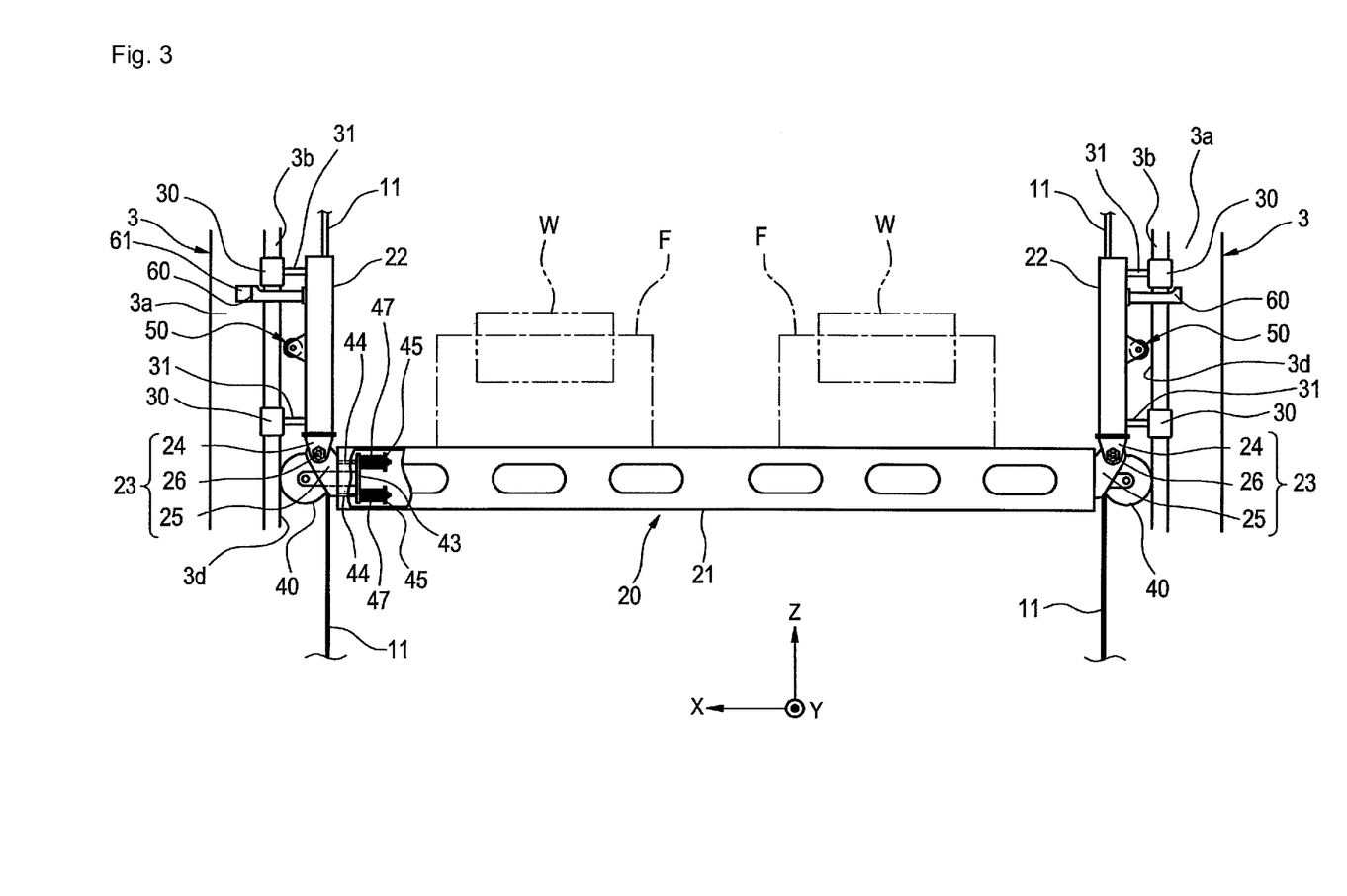
FIG. 3 is a side view of the platform of the stacker crane shown in FIG. 1.

As shown in FIGS. 2 and 3, the platform 20 is provided with a horizontal frame 21 disposed between the masts 3 and a pair of front and back vertical frames 22 which extend from the front and back ends of the horizontal frame 21 along the masts 3. In the horizontal frame 21, multiple beams are disposed inside a rectangular or substantially rectangular frame, thus reducing the weight and maintaining the strength. The timing belts 11 are attached to the vertical frames 22. Thus, the platform 20 is suspended from the timing belts 11. The horizontal frame 21 also includes two transfer devices F mounted in the front-back direction thereon.

Each transfer unit F includes a fork mechanism configured to expand or contract in the lateral direction (y-axis direction) and retrieves or stores work pieces W from or into the rack 200 using the fork mechanism. The transfer devices F are not limited to ones including a fork mechanism and may be any types of transfer devices, including a mechanism configured to grasp and transfer workpieces W. The number of transfer devices F mounted on the horizontal frame 21 is not limited to two and may be one or three or more.

Each timing belt 11, whose one end is attached to the upper end of the corresponding vertical frame 22, extends from the vertical frame 22 upward along the corresponding mast 3, is hung on the corresponding pulley 12, and extends downward along the mast 3 again. The timing belt 11 is also hung on a corresponding drive pulley 13 (see FIG. 11) and timing-belt positioning pulley 14 (see FIG. 11) disposed on the base 2. The other end thereof is attached to the lower end of the vertical frame 22. The drive pulleys 13 are rotationally driven by elevation motors 6 (see FIG. 1) mounted on the base 2.

Figure 4:
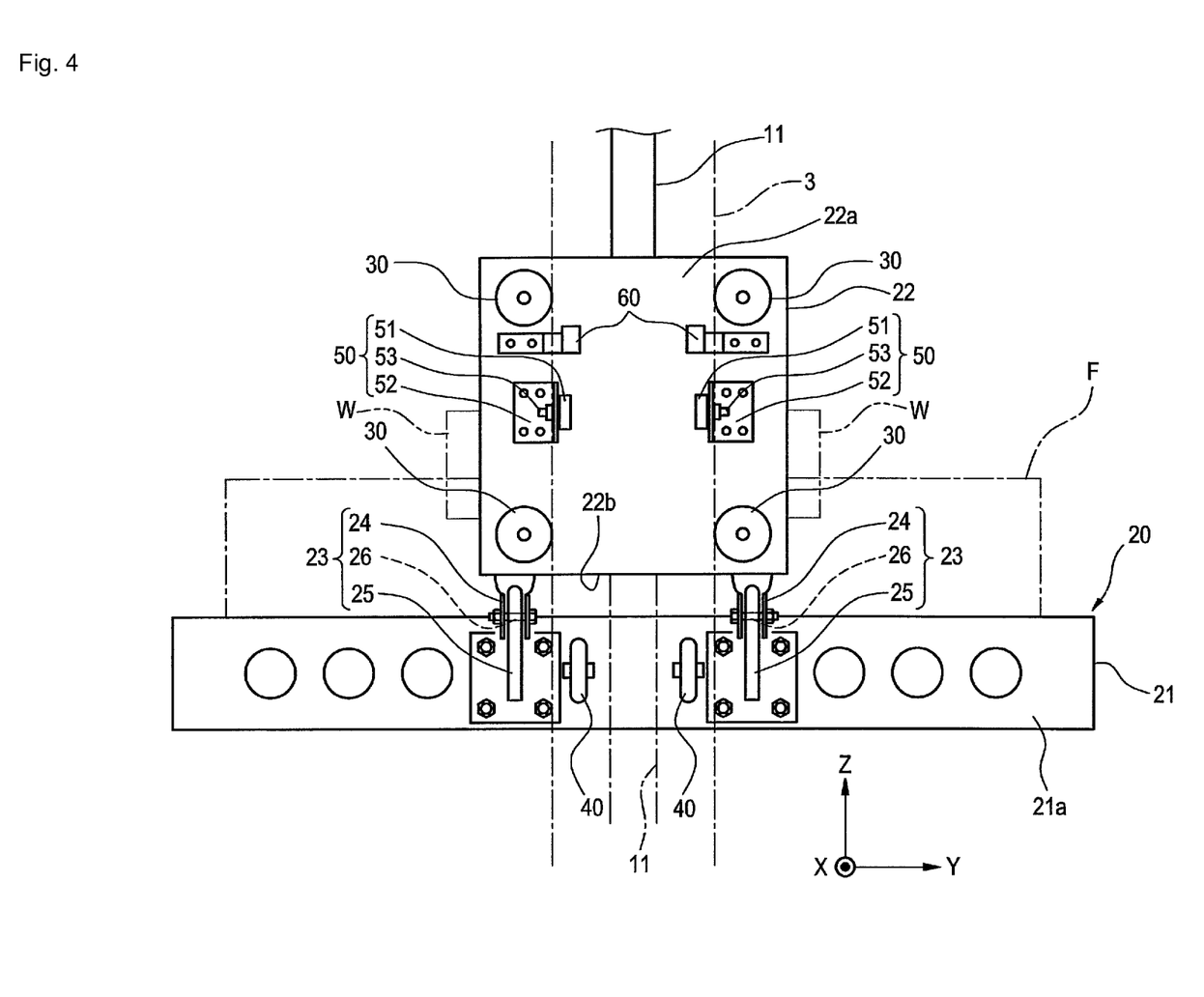
FIG. 4 is a front view of the platform of the stacker crane shown in FIG. 1.

As shown in FIGS. 2 to 4, two pairs of first guide rollers 30, a pair of upper rollers and a pair of lower rollers, are disposed on each of the vertical frames 22 of the platform 20 such that each pair of rollers sandwich a guide 3b of the corresponding mast 3. The first guide rollers 30 are rotatably held by shafts 31 mounted on the vertical frames 22. On the other hand, a pair of left and right second guide rollers 40 (to be discussed later) are disposed at each of the front and back ends of the horizontal frame 21 so as to be in contact with the opposite surface 3d of the corresponding mast 3 and rotate. As seen above, the first guide rollers 30 of the platform 20 are in contact with the guides 3b, and the second guide rollers 40 thereof are in contact with the opposite surfaces 3d. Since both rollers guide the platform 20 using the rolling structure thereof, the platform 20 is moved quickly.

Since the first guide rollers 30 are disposed on the two (upper and lower) positions of each vertical frame 22, the platform 20 is prevented from being tilted in the lateral direction (y-axis direction). Note that the first guide rollers 30 need not necessarily be disposed in the two (upper and lower) positions and may be disposed in one position or three or more positions. Since the first guide rollers 30 sandwich the guides 3b, the platform 20 is effectively prevented from rotating about the z-axis.

As shown in FIGS. 3 and 4, the vertical frames 22 and horizontal frame 21 are connected together via pairs of connecting portions 23. The connecting portions 23 allow the vertical frames 22 to rotate with respect to the horizontal frame 21. In each connecting portion 23, a pair of left and right brackets 24 disposed on the lower end surface 22b of the vertical frame 22 and a pair of left and right brackets 25 disposed on the end surface 21a (front, back) of the horizontal frame 21 are connected together by a connecting shaft 26 penetrating through these brackets in the lateral direction (y-axis direction). Thus, the vertical frames 22 are rotated with respect to the horizontal frame 21 using the lateral connecting shafts 26 as axes.

As shown in FIG. 4, each pair of brackets 24 include a pair of sandwiching pieces spaced at a predetermined distance, and each bracket 25 includes a sandwiched piece extending from the end surface 21a in the front-back and upward directions. The brackets 24 and 25 each include a through hole into which the connecting shaft 26 is capable of being inserted. With the bracket 25 inserted into the bracket 24, the connecting shaft 26 is inserted into both through holes and prevented from coming out by using a nut 28 (see FIG. 5) and the like. Thus, the brackets 24 and brackets 25 are connected together so as to be rotatable about the connecting shaft 26. The configuration of the connecting portion 23 is not limited to that described above and may be any type of known pin structure (hinge structure) which allows the vertical frame 22 to rotate using the lateral direction (y-axis direction) as an axis.

As shown in FIGS. 2 to 5, the pairs of left and right second guide rollers 40 are disposed on the front and back end surfaces 21a of the horizontal frame 21 such that each pair of second guide rollers 40 is in contact with the opposite surface 3d of the corresponding mast 3. Of the pairs of second guide rollers 40, the pair of second guide rollers 40 on the front side of the horizontal frame 21 (the second guide rollers 40 on the left side in FIG. 2) elastically expand and contract in the front-back direction (x-axis direction).

Figure 5:
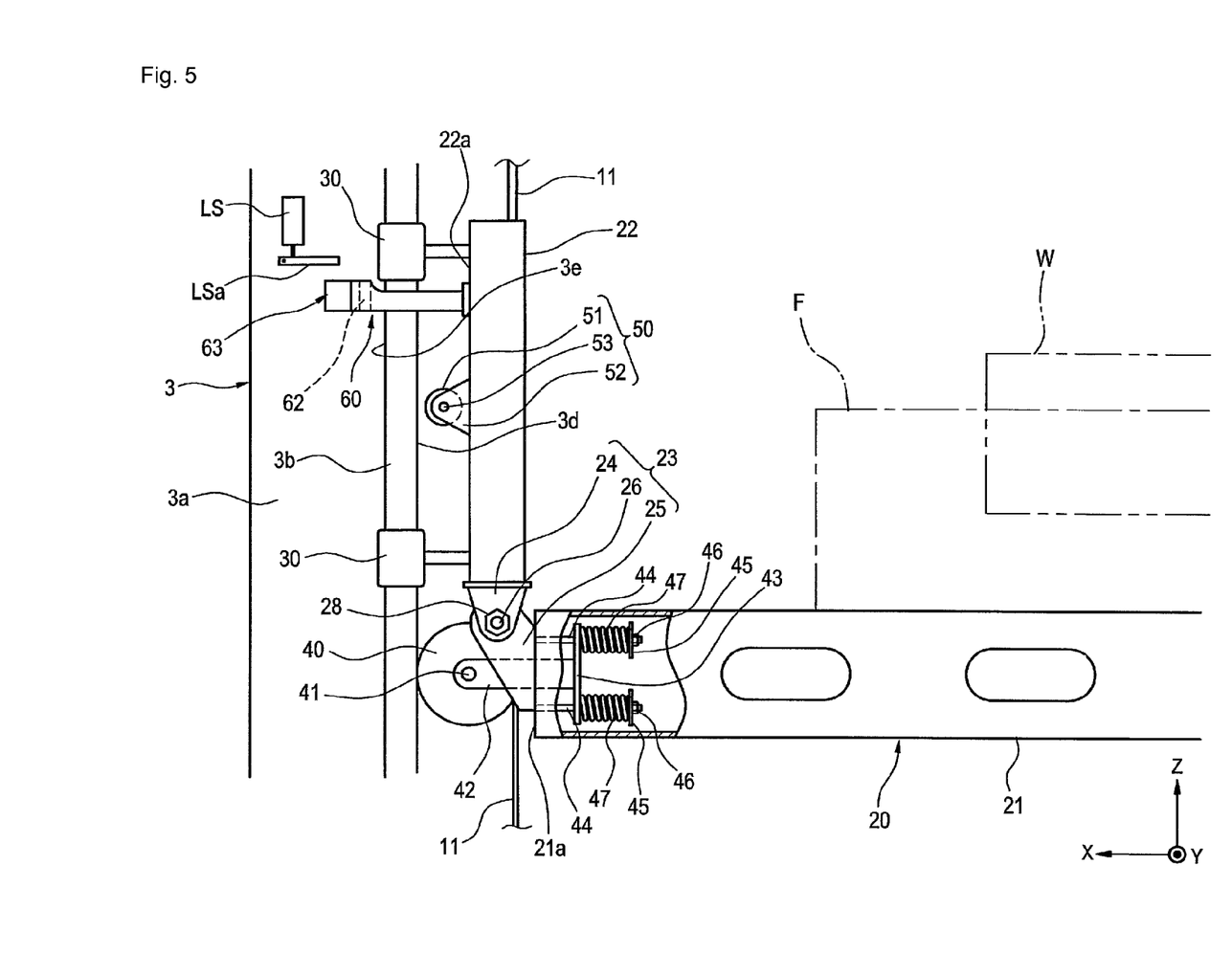
FIG. 5 is an enlarged side view of a major portion of the platform of the stacker crane shown in FIG. 1.

As shown in FIG. 5, the pair of second guide roller 40, which is configured to expand and contract in the front-back direction, are rotatably held by a shaft 41 disposed at the front end of a supporter 42. The supporter 42 penetrates through the end surface 21a of the horizontal frame 21 and includes a plate at an end thereof opposite to the shaft 41 (inside the horizontal frame 21). A pair of upper and lower rods 44 fixed to the end surface 21a penetrate through upper and lower portions of the plate 43. Holding discs 45 are fixed to ends of the rods 44 using nuts 46, and springs 47 are inserted between the holding discs 45 and plate 43. Thus, the second guide rollers 40 supported by the supporter 42 are elastically expanded and contracted in the front-back direction (x-axis direction) by the springs 47. The elasticity of the springs 47 is capable of being adjusted by adjusting the amount of screwing of the nuts 46.

In the normal state, in which the platform 20 is disposed between the masts 3, the second guide rollers 40 are in contact with the opposite surface 3d and are drawn back to some extent (the springs 47 are contracted to some extent) (see FIG. 5). Thus, when the platform 20 is tilted, the second guide rollers 40 move forward and maintain the contact with the opposite surface 3d. This prevents the platform 20 from wobbling, as well as prevents the horizontal frame 21 from colliding with the mast 3.

When the distance between the masts 3 is widened or narrowed compared to the normal state, the second guide rollers move forward or move backward based on or against the elasticity of the springs 47. Thus, the second guide rollers 40 maintain the contact with the opposite surface 3d and thus maintain the stable elevation of the platform 20. Further, when the masts 3 vibrate, the second guide rollers 40 expand and contract to follow the vibration, thus reducing transmission of the vibration to the platform 20.

Note that whether to provide the second guide rollers 40 that are expandable in the front-back direction is optional. Guide rollers which do not expand or contract may be used. The expandable second guide rollers 40 may be provided at both the front and back ends of the horizontal frame 21. While the shown second guide rollers 40 are preferably disposed in two positions in the lateral direction of the horizontal frame 21, for example, they may be disposed otherwise. For example, the second guide rollers 40 may be disposed in one position or three or more positions. Further, the configuration which allows the second guide rollers 40 to elastically expand and contract is not limited to that shown in the drawings, and any other configurations may be used.

As shown in FIGS. 3 to 5, a pair of stoppers 50 preferably are disposed in the lateral direction on each of the vertical frames 22. Each stopper 50 includes a bracket 52 fixed to a mast opposite surface 22a of the vertical frame 22 and a roller 51 which is rotatably held by the bracket 52 via a shaft 53. Each pair of stoppers 50 are disposed in vertical or approximately vertically central positions on the vertical frame 22. In the normal state, each stopper 50 is spaced from the opposite surface 3d of the mast 3 at a predetermined distance so that the roller 51 thereof does not contact the opposite surface 3d. Thus, when the vertical frame 22 rotates in a direction in which it comes close to the opposite surface 3d of the mast 3, the rollers 51 of the stoppers 50 contact the opposite surface 3d of the mast 3. This prevents the vertical frame 22 from colliding with the mast 3.

Further, since the rollers 51 are rotatable, they have less impact on the opposite surface 3d when they contact the surface. Thus, damage to the mast 3 is prevented. While the stoppers 50 are preferably disposed in the vertical or approximately vertically central positions of the vertical frame 22, they may be disposed in other positions. For example, the stoppers 50 may be disposed in upper positions of the vertical frame 22. If the stoppers 50 are disposed in upper positions of the vertical frame 22 so as to be spaced from the opposite surface 3d as in FIG. 5, it is possible to reduce the rotation angle at which the vertical frame 22 comes close to the mast 3. The stoppers 50 need not necessarily be disposed in the pair of left and right positions and may be disposed in one position or three or more positions. The stoppers 50 need not necessarily include the rollers 51 and may include non-rotational contact pieces.

Figure 6A:
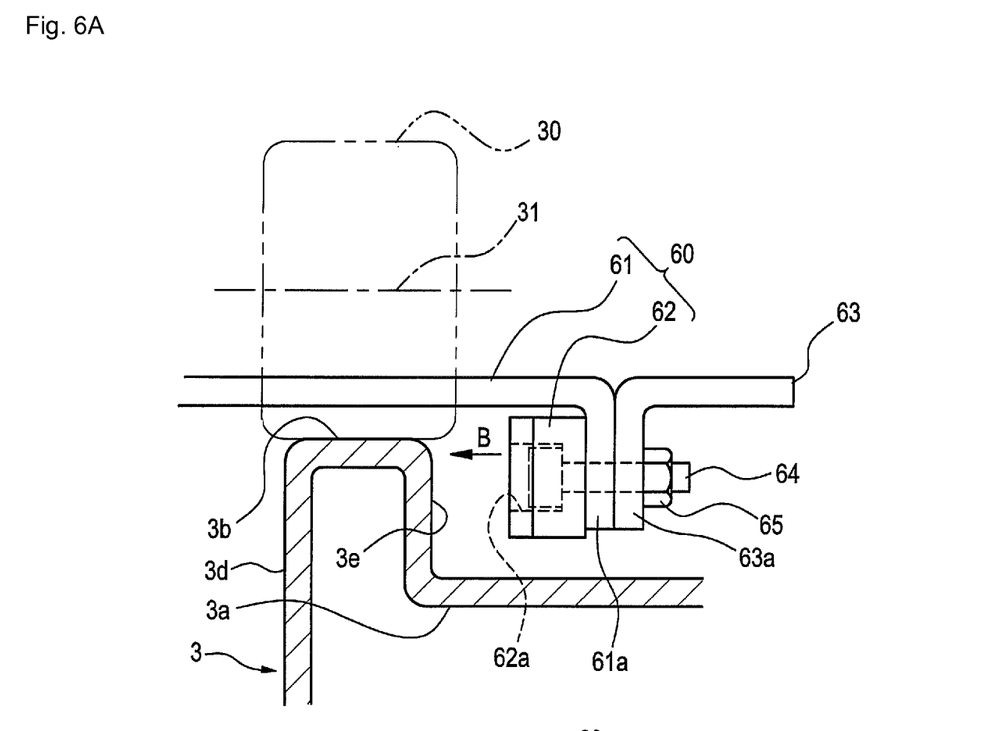
Figure 6B:
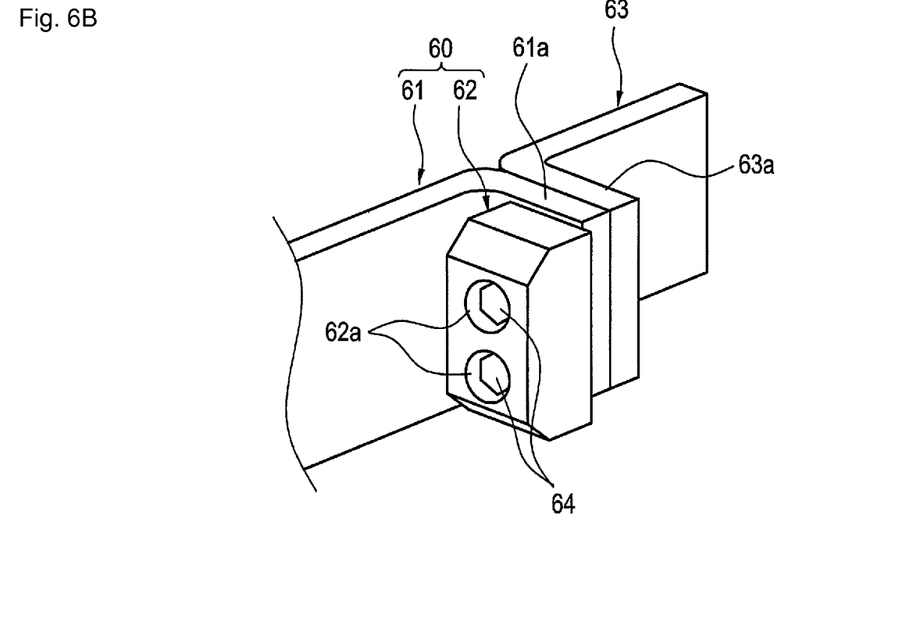

As shown in FIGS. 2 to 4, a pair of left and right hooks 60 are disposed adjacent to the upper edge of the mast opposite surface 22a of each vertical frame 22. As shown in FIGS. 6A and 6B, each hook 60 includes an arm 61 which extends from the mast opposite surface 22a forward and whose front end 61a is bent toward behind the guide 3b of the mast 3 and a contact piece 62 attached to the inside of the front end 61a. The contact piece preferably is made of a resin or the like having a small friction coefficient against the surface of the mast 3. The contact piece 62 is fixed to the front end 61a preferably by fastening a bolt 64 screwed from a recess 62a thereof using a nut 65, for example. This prevents the head of the bolt 64 from protruding from the contact piece 62. The contact piece 62 is spaced from a side surface 3e of the mast 3 at a predetermined distance.

Thus, when the vertical frame 22 rotates in a direction in which the vertical frame 22 moves away from the mast 3, the contact pieces 62 of the hooks 60 move in a direction in which they come close to the side surfaces 3e of the mast 3 (the direction of arrow B in FIG. 6A) and are finally stopped by the side surfaces 3e. As a result, the rotation of the vertical frame 22 in the moving-away direction is restricted. This prevents the vertical frame 22 from largely moving away from the mast 3 and prevents the first guide rollers 30 from being detached from the guides 3b. Further, even when the contact piece 62 contacts the mast 3, it has less impact on the mast 3 and prevents damage to the mast 3, since it is made of a resin having a small friction coefficient against the surface of the mast 3, and the head of the bolt 64 does not protrude from the contact piece 62.

The hooks 60 need not necessarily include the contact pieces 62 and may include rollers in place of the contact pieces 62. Further, the hooks 60 need not necessarily be disposed in the positions shown in the drawings. If the hooks 60 are disposed in positions closer to the upper end of the vertical frame 22 so as to be spaced from the side surface 3e as in FIG. 6, it is possible to reduce the rotation angle at which the vertical frame 22 moves away from the mast 3.

While the two pairs of left and right hooks 60, that is, the four hooks 60 are disposed in the present preferred embodiment, one of these hooks is provided with an operation portion 63 configured to operate a limit switch LS as shown in FIG. 5. As shown in FIG. 6, the operation portion 63 preferably is an L-shaped member, and a fixing portion 63a thereof butts at the front end 61a of the arm 61. Along with the contact piece 62, the fixing portion 63a is penetrated by the bolt 64 and tightened by the nut 65. Thus, the operation portion 63 is fixed. The operation portion 63 extends in the same direction as the arm 61.

The limit switch LS is configured to detect that the platform 20 has exceeded the upper limit or lower limit and, as shown in FIG. 5, is disposed on an outer portion 3a of the mast 3. While the limit switch LS corresponding to the upper limit position of the platform 20 is shown in FIG. 5, a limit switch corresponding to the lower limit position is disposed on the mast 3 in a similar manner. The limit switch LS outputs a signal when the operation portion 63 contacts a detector LSa thereof. Based on this signal, for example, it is possible to interrupt the power supply to the elevation motors 6 driving the timing belts 11 to urgently stop the platform 20.

To avoid interference with the first guide rollers 30, the limit switch LS is disposed on a portion distant from the vertical frame 22, of the mast 3. Since the operation portion 63 is disposed on the hook 60, there is no need to use a dedicated stay or the like. Note that the operation portion 63 need not necessarily be provided on the hook 60 and may be directly disposed on the vertical frame 22. The limit switch LS may be a non-contact limit switch such as an optical sensor in place of the contact limit switch described above.

Figure 7:
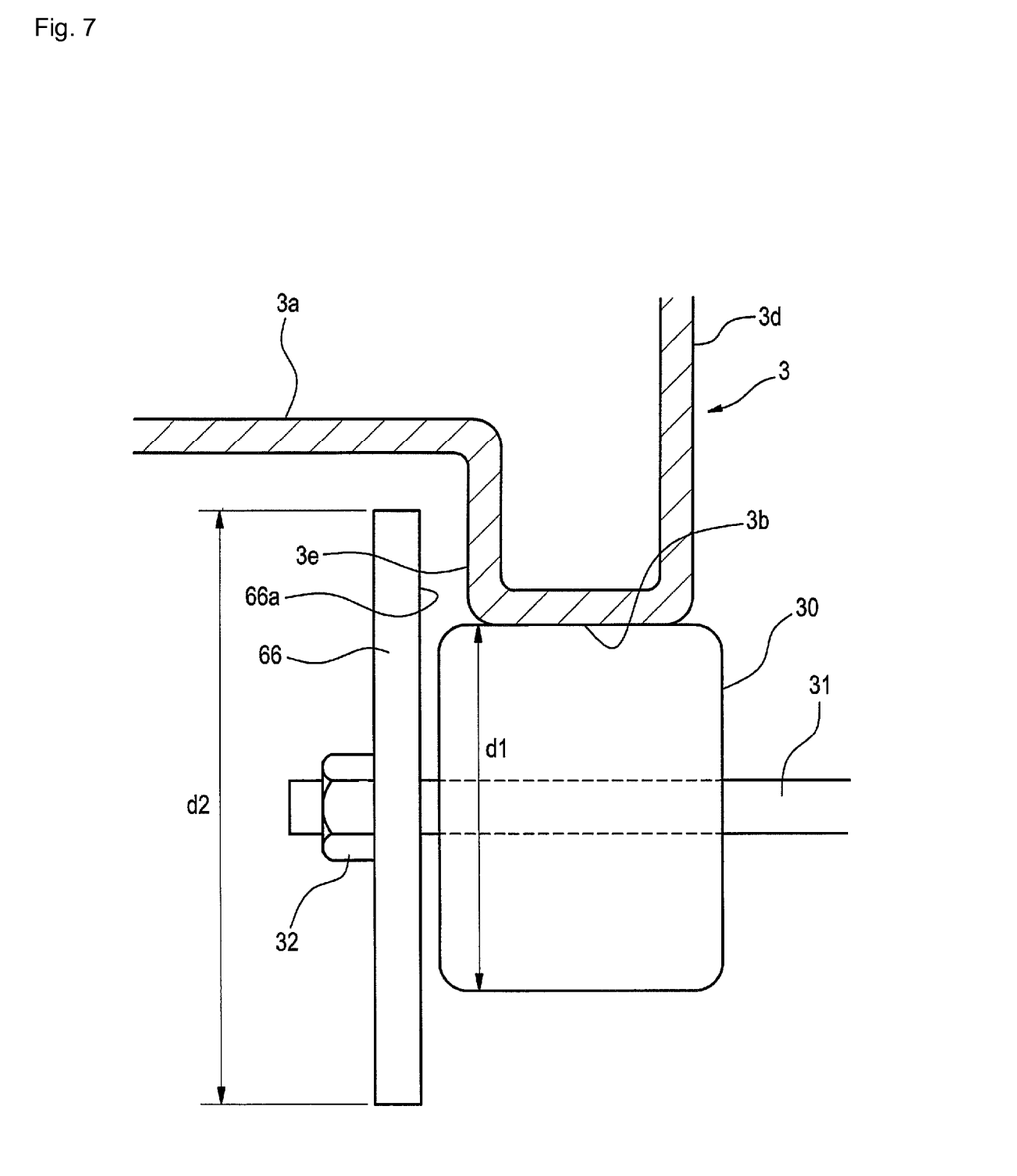
FIG. 7 is an enlarged view of a major portion of a modification of the hook.

FIG. 7 shows a modification of the hook. A hook 66 preferably is a circular or substantially circular tabular member which is fastened to the front end of a shaft 31 of the first guide roller 30 using a nut 32. The hook 66 has a diameter d2 larger than the diameter d1 of the first guide roller 30. Accordingly, as shown in FIG. 6, a stopped surface 66a of the hook 66 is opposed to the side surface 3e of the mast 3 so as to be spaced therefrom at a predetermined distance. The hook 66 is preferably made of, for example, a metal or resin. If a metal hook is used, the friction coefficient against the mast 3 is capable of being reduced by coating the stopped surface 66a with a resin.

As with the hook 60, when the vertical frame 22 rotates in a direction in which it moves away from the mast, the stopped surface 66a of the hook 66 is stopped by the side surface 3e. Thus, it is possible to restrict the rotation of the vertical frame 22 in the moving-away direction to avoid detachment of the first guide roller 30 from the guide 3b. Note that whether the hook 66 is rotatably held as with the first guide roller 30 is optional. The hook 66 may be a tabular piece extending from the shaft 31 toward the mast 3 in place of the circular or substantially circular tabular member. As seen above, the hook preferably includes the shaft 31 of the first guide roller 30 and thus the structure is simplified.

Figure 8:
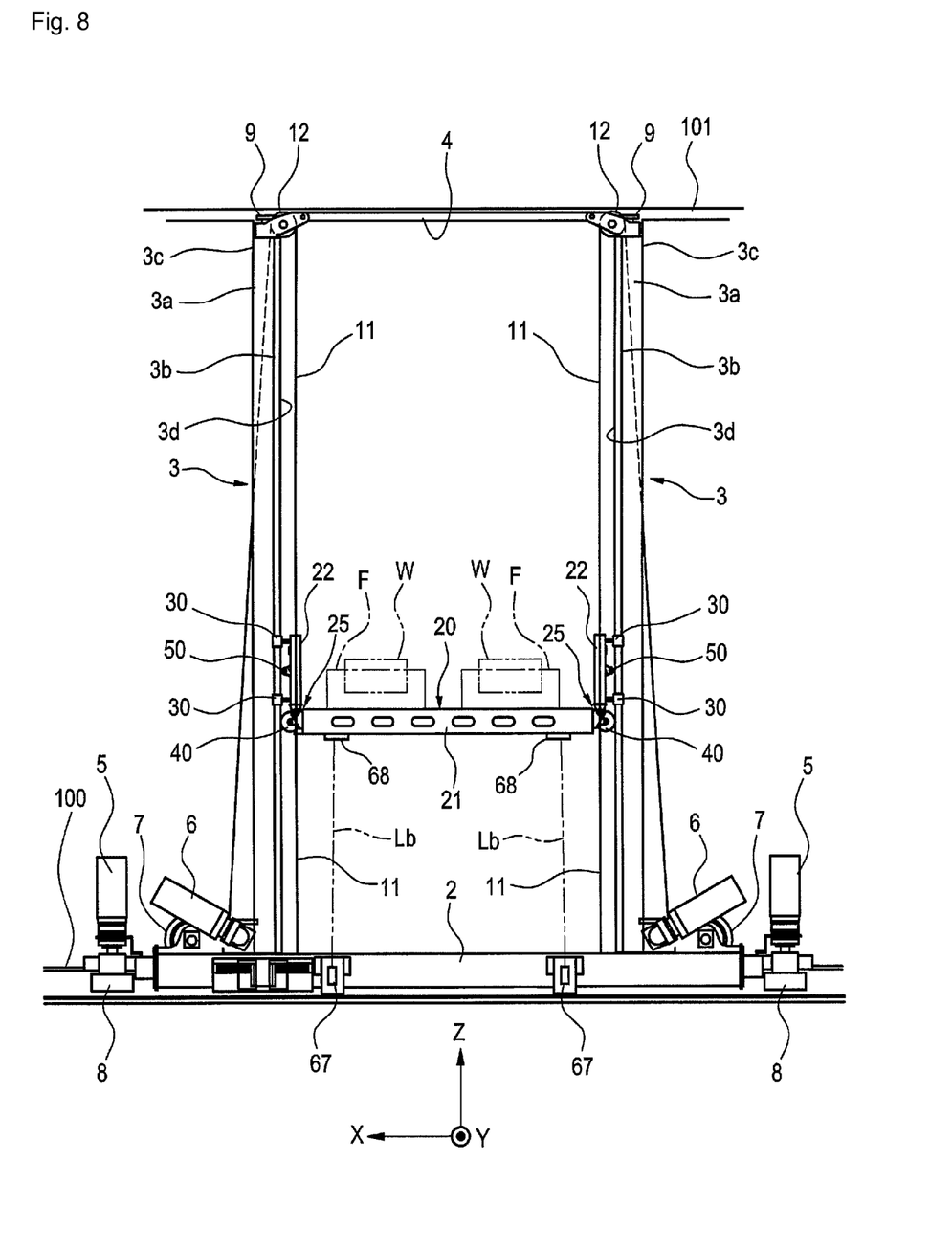
FIG. 8 is a side view of the stacker crane shown in FIG. 1.

As shown in FIG. 8, laser range finders 67 preferably are disposed in two positions on the base 2 which are below the platform 20 and are distant from each other in the front-back direction (x-axis direction). On the other hand, reflectors 68 are preferably disposed in positions on the bottom surface of the horizontal frame 21 of the platform 20 which are directly above the laser range finders 67. The laser range finders 67 are configured to emit laser beams Lb toward the corresponding reflectors 68, receive the laser beams Lb returned from the reflectors 68, and determine the distances to the reflectors 68 using the interference between both laser beams.

Based on the determined distances to the reflectors 68, the laser range finders 67 determine the heights of the reflectors 68, that is, the heights of the front and back positions of the horizontal frame 21. The elevation motors 6 are controlled based on the heights of the horizontal frame 21 determined by the laser range finders 67. Thus, the platform 20 is raised or lowered to a desired position. If there is a difference between the determined heights, for example, a value obtained by summing up and dividing the two determined heights may be used as the height of the platform 20. Note that the different determined heights indicate that the horizontal frame is tilted in the front-back direction. Accordingly, the elevation motors 6 are driven to eliminate this tilt. Note that the instruments configured to determine the height of the platform 20 need not necessarily be the laser range finders 67 and may be any other known measuring instruments.

As seen above, the posture of the platform 20 is maintained by controlling the elevation motors 6. However, if one of the laser range finders 67 fails and thus outputs an erroneous determined value, if one of the elevation motors 6 fails, or if one of the timing belts 11 extends, the platform 20 is tilted in the front-back direction (rotated about the y-axis).

Figure 9:
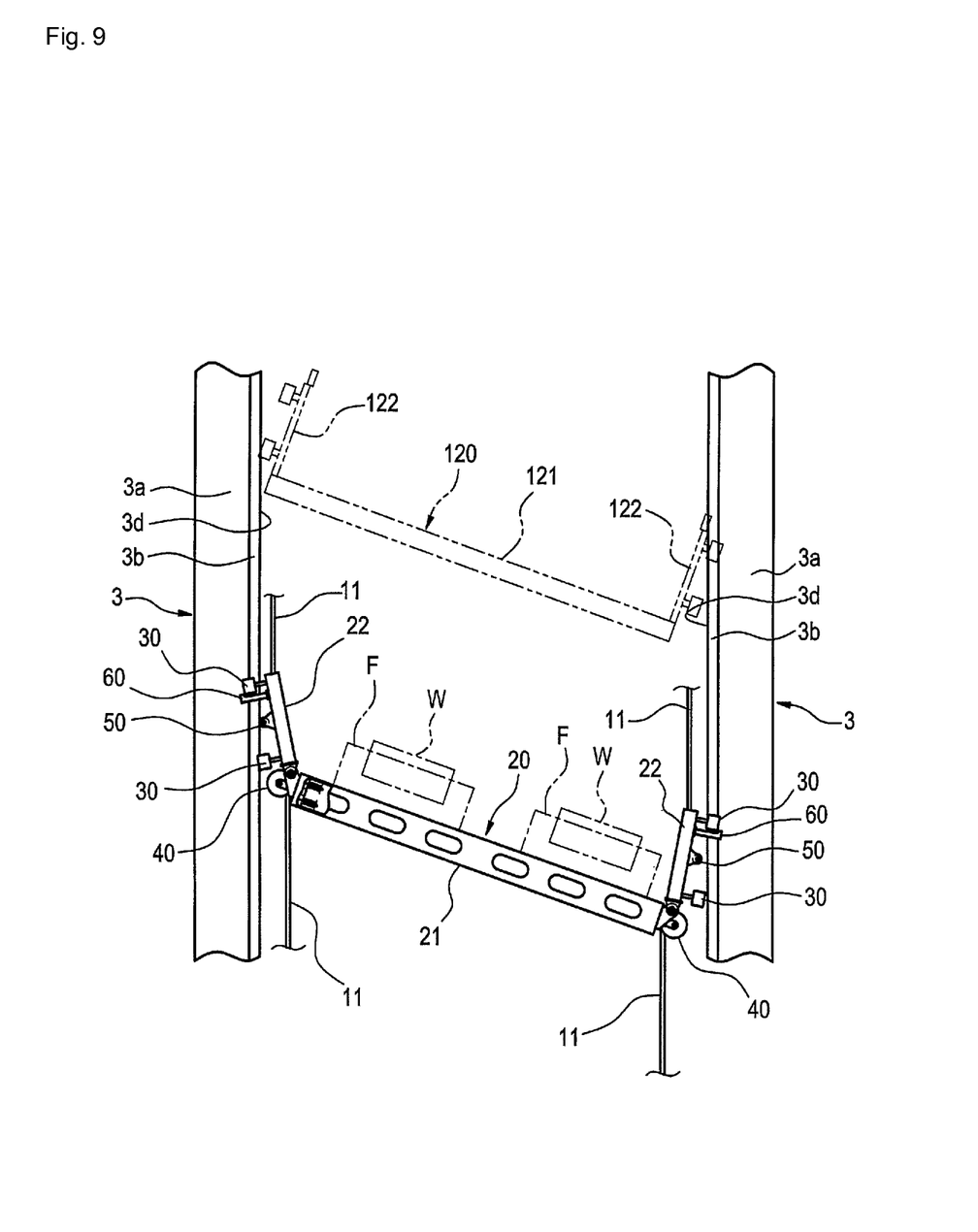
FIG. 9 is a schematic side view showing an operation when the platform is tilted.

As shown in FIG. 9, when the horizontal frame 21 is tilted in the front-back direction, the vertical frames 22 are pulled by the horizontal frame 21 and thus are tilted. However, the rotatable connecting portions 23 exist between both and therefore the amounts of rotation of the vertical frames 22 with respect to the masts 3 are reduced. This prevents any vertical frame 22 from colliding with the corresponding mast 3. Imagine a platform 120 having no connecting portions 23 as shown by a chain double-dashed line in FIG. 9. When a horizontal frame 121 is tilted, vertical frames 122 are tilted as well. The upper edge of the right vertical frame 122 is colliding with the mast 3.

Further, for the platform 20, the stopper 50 contacts the opposite surface 3d of the mast 3 and thus the rotation of the vertical frame 22 in a direction in which it comes close to the mast 3 is restricted. Furthermore, the hook 60 is stopped by the side surface 3e of the mast 3 and thus the rotation of the vertical frame 22 in a direction in which it moves away from the mast 3 is restricted. This reliably prevents the vertical frame 22 from colliding with the mast 3, as well as prevents the first guide roller 30 from being largely detached from the guide 3b. In FIG. 9, the upper first guide rollers 30 are yet to be detached from the guides 3b of the masts 3. Accordingly, by adjusting the amounts of elevation of the front and back timing belts 11 in the state shown in FIG. 9, the horizontal frame 21 is easily restored to its horizontal state.

Further, the horizontal frame 21 is provided with the second guide rollers 40, which elastically expand and contract in the front-back direction. Accordingly, when the horizontal frame is tilted, the second guide rollers 40 continue to be elastically in contact with the opposite surfaces 3d of the masts to a certain extent. This prevents the horizontal frame 21 from colliding with the masts 3, as well as significantly reducing the vibration of the platform 20.

Figure 10:
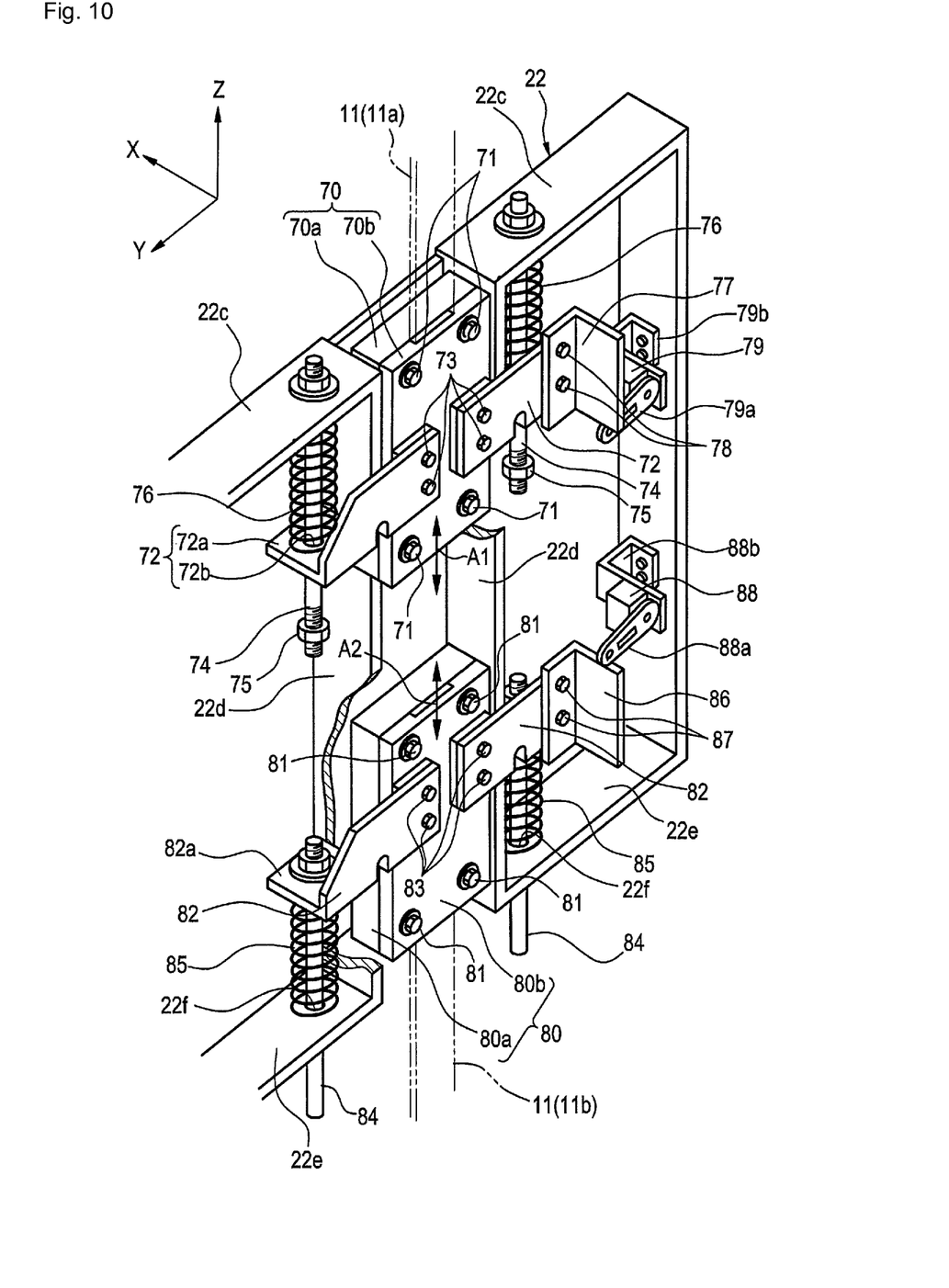
FIG. 10 is a perspective view showing a structure in which a vertical frame and a timing belt are connected together.

As shown in FIG. 10, the timing belt 11 is attached to the vertical frame 22. An end 11a of the timing belt 11 is attached to an upper fixing member 70 disposed adjacent to the upper end of the vertical frame 22. The upper fixing member 70 includes two tabular members disposed along the vertical frame 22, that is, a first member 70a and a second member 70b. The upper fixing member 70 is disposed between two vertical (z-axis direction) ribs 22d disposed in the vertical frame 22. The end 11a of the timing belt 11 is attached to the upper fixing member 70 preferably using a fastening bolt 71 so as to be sandwiched between the first member 70a and second member 70b.

Two upper plates 72 are fixed to the second member 70b of the upper fixing member 70 preferably using fixing screws 73 so as to extend in the lateral direction (y-axis direction). Each upper plate 72 includes a spring receiver 72a including an edge which is bent so as to be horizontal or approximately horizontal. The spring receiver 72a includes a through hole 72b through which a support pin 74 passes. The support pin 74 is fixed to an upper end wall 22c of the vertical frame 22 and is hanging down. A spring 76 is disposed between the upper end wall 22c of the vertical frame 22 and the spring receiver 72a. The support pin 74 passes through the spring 76. A nut 75 is attached to an end of the support pin 74 to prevent the upper plate 72 from coming out.

The upper fixing member 70 is held between the ribs 22d of the vertical frame 22 so as to be movable in the direction of arrow A1 (vertical direction, z-axis direction). In the normal state, the upper fixing member 70 is pulled by the portion leading to the end 11a, of the timing belt 11 and thus is located in a somewhat upper position, and the springs 76 are contracted to some extent.

A limit switch 79 corresponding to the upper fixing member 70 is disposed on an upper portion of the vertical frame 22. The limit switch 79 is fixed to the vertical frame 22 via a stay 79b and includes a detection arm 79a. An operation plate 77 having an L-shaped section is fixed to one of the upper plates 72 (the right upper plate 72 in FIG. 10) using a screw 78. The operation plate 77 is located above the arm 79a. Accordingly, when the tension of the portion leading to the end 11a of the timing belt 11 significantly decreases or when the timing belt 11 is broken, the upper fixing member 70 is largely moved downward by the springs 76. The upper fixing member 70 then operates the arm 79a using the operation plate 77 to activate the limit switch 79. The limit switch 79 then outputs a signal, for example, to urgently stop the platform 20.

The other end 11b of the timing belt 11 is attached to a lower fixing member 80 disposed adjacent to the lower end of the vertical frame 22. As with the upper fixing member 70, the lower fixing member 80 includes two tabular members disposed along the vertical frame 22, that is, a first member 80a and a second member 80b. The lower fixing member 80 is disposed between two vertical (z-axis direction) ribs 22d disposed in the vertical frame 22. The end 11b of the timing belt 11 is attached to the lower fixing member 80 using a fastening bolt 81 so as to be sandwiched between the first member 80a and second member 80b.

Two lower plates 82 are fixed to a second member 80b of the lower fixing members 80 using fixing screws 83 to extend in the lateral direction (y-axis direction). Each lower plate 82 includes a spring receiver 82a including an edge which is bent so as to be horizontal or approximately horizontal. A hanging support pin 84 is fixed to the spring receiver 82a. A lower end wall 22e of the vertical frame 22 includes through holes 22f through which the support pins 84 pass. Springs 85 are disposed between the spring receivers 82a and the lower end wall 22e of the vertical frame 22. The support pins 84 pass through the springs 85.

The lower fixing member 80 is held between the ribs 22d of the vertical frame 22 so as to be movable in the direction of arrow A2 (vertical direction, z-axis direction). In the normal state, the lower fixing member 80 is pulled by the portion leading to the end 11b, of the timing belt 11 and thus is located in a somewhat lower position, and the springs 85 are contracted to some extent. Note that when the tension of the timing belt 11 changes, the lower fixing member 80 moves up or down based on the elasticity of the springs 85 to keep the tension of the timing belt 11 constant. That is, the change in the tension of the timing belt 11 is accommodated by the upward or downward movement of the lower fixing member 80.

A limit switch 88 corresponding to the lower fixing member 80 is disposed on a lower portion of the vertical frame 22. The limit switch 88 is fixed to the vertical frame 22 via a stay 88b and includes a detection arm 88a. An operation plate 86 having an L-shaped section is fixed to one of the lower plates 82 (the right lower plate 82 in FIG. 10) preferably using a screw 87. The operation plate 86 is located below the arm 88a. Accordingly, when the tension of the portion leading to the end 11b, of the timing belt 11 significantly decreases or when the timing belt 11 is broken, the lower fixing member 80 is largely moved up by the springs 85. The lower fixing member 80 then operates the arm 88a using the operation plate 86 to activate the limit switch 88. The limit switch 88 then outputs a signal, for example, to urgently stop the platform 20.

Figure 11:
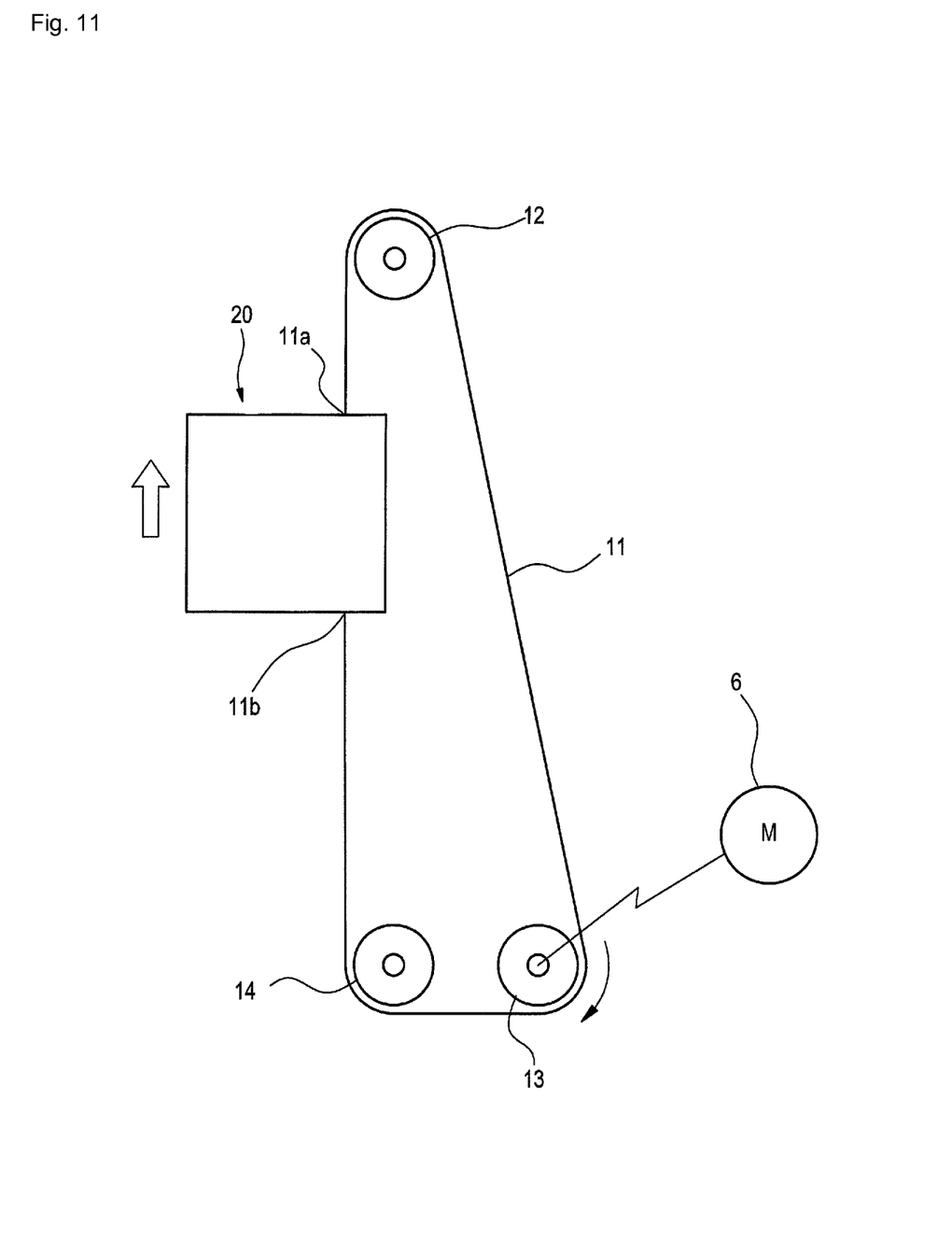
FIG. 11 is a schematic conceptual diagram showing the elevation operation of the platform.

The operation of the timing belt 11 will now be described. As shown in FIG. 11, the timing belt 11 is connected to the upper and lower edges of the platform 20 (vertical frame 22) and hung on a pulley 12 disposed at the upper end 3c of the mast 3 and a drive pulley 13 and pulley 14 disposed on the base 2. The timing belt 11 is hung with a predetermined tension, and teeth provided on the inner surface thereof are engaged with the waveforms of the pulley 12 and the like. When the elevation motor 6 rotationally drives the drive pulley 13, the timing belt is moved to raise or lower the platform 20. The elevation position of the platform 20 is accurately and quickly set based on the amount of movement of the timing belt 11.

When the drive pulley 13 is rotated clockwise as shown by an arrow in FIG. 11 in order to raise the platform 20, the portion from the end 11a to the drive pulley 13, of the timing belt 11 is extended by the load of the platform 20 and the tensile force of the drive pulley 13. In particular, a heavy load is applied to the end 11a when the platform 20 starts to move up, and thus the portion from the end 11a to the drive pulley 13, of the timing belt 11 is largely extended. On the other hand, the portion from the drive pulley 13 to the end 11b, of the timing belt 11 is the portion advanced by the drive pulley and therefore tends to be loosened. Thus, the engagement between the timing belt 11 and pulley 14 may be loosened, resulting in tooth skipping.

Such tooth skipping causes vibration or noise, as well as affects the drive of the timing belt 11 by the drive pulley 13. A conceivable method for preventing such tooth skipping is to increase the initial tension set to the timing belt 11. However, this method requires a belt having high breaking strength, as well as requires providing the peripheral portions, such as the mast 3 and pulley 12, with rigidity which allows such portions to withstand high tension. Accordingly, this method is disadvantageous in terms of cost.

In the present preferred embodiment, the timing belt attachment structure shown in FIG. 10 is preferably used. Thus, for example, when the rise of the platform 20 reduces the tension of the portion from the drive pulley 13 to the end 11b, of the timing belt 11, the lower fixing member 80 moves up based on the elasticity of the springs 85. As a result, the tension of the portion leading to the end 11b is maintained. Since the tooth skipping between the timing belt 11 and pulley 14 and the like is prevented, the platform 20 is raised or lowered stably.

When the tension of the end 11a significantly decreases due, for example, to breakage of the timing belt 11, the upper fixing member 70 moves down and activates the limit switch 79 using the operation plate 77 to urgently stop the platform 20. Similarly, when the tension of the end 11b significantly decreases, the lower fixing member 80 moves up and activates the limit switch 88 using the operation plate 86 to urgently stop the platform 20. The urgent stop includes interrupting the power supply to the elevation motors 6, as well as holding the platform 20 on the mast 3 by driving a brake (not shown).

While preferred embodiments have been described, the present invention is not limited to the shapes and the like shown in the drawings. Changes can be made to the shapes and the like without departing from the functions, purposes, and the like of the elements. While the base 2 including the masts preferably travels on the floor rail 100 in the present preferred embodiment, other types of bases may be used, including one which freely travels without the floor rail 100 and one which travels while being suspended from the ceiling rail. While the timing belts 11, the pulley 12 and the like are preferably used in the present preferred embodiment, chains and sprockets may be used in place of these elements.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A stacker crane comprising:
 a pair of front and back masts disposed in a vertical direction;
 a platform located between the pair of front and back masts and including a horizontal frame including a transfer device mounted thereon and vertical frames extending from front and back ends of the horizontal frame along the pair of front and back masts; wherein
 the platform is configured to be raised or lowered with the vertical frames suspended;
 each of the vertical frames includes a pair of first guide rollers sandwiching one of the pair of front and back masts in a lateral direction perpendicular or substantially perpendicular to a front-back direction and is connected to the horizontal frame to be rotatable with respect to the horizontal frame about an axis extending along the lateral direction; and
 each of the vertical frames includes a hook spaced from one of the pair of front and back masts and configured to be stopped by the one of the pair of front and back masts spaced from the hook when the vertical frame rotates in a direction in which the vertical frame moves away from the one of the pair of front and back masts.

2. The stacker crane of claim 1, wherein the horizontal frame includes second guide rollers in contact with opposite surfaces of the pair of front and back masts and configured to elastically expand and contract in the front-back direction.

3. The stacker crane of claim 1, wherein each of the vertical frames includes a stopper configured to contact one of the pair of front and back masts when the vertical frame rotates in a direction in which the vertical frame approaches the one of the pair of front and back masts.

4. The stacker crane of claim 1, wherein the hook includes an operation portion configured to activate a limit switch when the platform exceeds a lower-limit position or an upper-limit position.

5. A method for using a stacker crane comprising:
 providing a platform between a pair of front and back masts disposed in a vertical direction, the platform including a horizontal frame including a transfer device mounted thereon and vertical frames extending from front and back ends of the horizontal frame along the pair of front and back masts; and raising or lowering the platform with the vertical frames suspended; wherein each of the vertical frames includes a pair of first guide rollers sandwiching one of the pair of front and back masts in a lateral direction perpendicular or substantially perpendicular to a front-back direction and is connected to the horizontal frame to be rotatable with respect to the horizontal frame about an axis extending along the lateral direction; and each of the vertical frames includes a hook spaced from one of the pair of front and back masts and configured to be stopped by the one of the pair of front and back masts spaced from the hook when the vertical frame rotates in a direction in which the vertical frame moves away from the one of the pair of front and back masts.

* * * * *